(12) United States Patent
Narla et al.

(10) Patent No.: US 11,316,471 B2
(45) Date of Patent: Apr. 26, 2022

(54) MANUAL TRANSFER SWITCH FOR ONSITE ENERGY GENERATION AND STORAGE SYSTEMS

(71) Applicant: Tesla, Inc., Palo Alto, CA (US)

(72) Inventors: Sandeep Narla, San Jose, CA (US); Eric Daniel Carlson, San Mateo, CA (US); Andrew Russell Lutkus, Martinez, CA (US)

(73) Assignee: Tesla, Inc., Austin, TX (US)

( * ) Notice: Subject to any disclaimer, the term of this patent is extended or adjusted under 35 U.S.C. 154(b) by 170 days.

(21) Appl. No.: 15/581,426

(22) Filed: Apr. 28, 2017

(65) Prior Publication Data

US 2018/0131226 A1 May 10, 2018

Related U.S. Application Data

(60) Provisional application No. 62/419,424, filed on Nov. 8, 2016.

(51) Int. Cl.
*H02S 40/38* (2014.01)
*H02J 7/35* (2006.01)
(Continued)

(52) U.S. Cl.
CPC .............. *H02S 40/38* (2014.12); *H02J 3/383* (2013.01); *H02J 7/35* (2013.01); *H02J 9/04* (2013.01);
(Continued)

(58) Field of Classification Search
CPC .......... H02S 40/32; H02S 40/38; H02S 40/30; H02S 40/36; H02S 10/20; H02J 7/355;
(Continued)

(56) References Cited

U.S. PATENT DOCUMENTS 9,369,126 B1 6/2016 Dunton et al.
9,397,504 B1 7/2016 Narla et al.
(Continued)

FOREIGN PATENT DOCUMENTS

CA 2850983 11/2015
EP 2325970 A2 5/2011
(Continued)

OTHER PUBLICATIONS

Decision to Grant received for Chinese Patent Application No. 201910331250.6, dated May 8, 2020, 2 pages (Official Copy Only) See Communication under 37 CFR § 1.98(a) (3).
(Continued)

*Primary Examiner* — Richard Isla
*Assistant Examiner* — Michael N Dibenedetto
(74) *Attorney, Agent, or Firm* — Dentons US LLP

(57) ABSTRACT

A manually controlled coupling mechanism for onsite energy generation and storage systems includes a first contact portion having a first electrical contact for coupling to an utility grid and a second electrical contact for coupling to an on-grid AC terminal of an inverter, a second contact portion having a third electrical contact for coupling to an off-grid output terminal of the inverter, and a manually activated multi-position switch, wherein in a first position, only the first contact portion is activated to allow power transfer between the utility grid, the on-grid AC terminal of the inverter and a main electrical panel, and in the second position, only the second contact portion is activated to allow power transfer from the off-grid output terminal of the inverter to the main electrical panel.

20 Claims, 7 Drawing Sheets

(51) Int. Cl.
*H02J 3/38* (2006.01)
*H02J 9/04* (2006.01)
*H02J 3/32* (2006.01)
*H02J 7/00* (2006.01)

(52) U.S. Cl.
CPC .............. *H02J 3/32* (2013.01); *H02J 7/0022* (2013.01); *Y02B 10/70* (2013.01); *Y02E 10/56* (2013.01)

(58) Field of Classification Search
CPC ...... H02J 7/0029; H02J 7/0045; H02J 7/0047; H02J 7/0068; H02J 7/34; H02J 7/35; H02J 7/0022; H02J 3/383; H02J 3/32; Y02B 10/70; Y02E 10/56
See application file for complete search history.

(56) References Cited

U.S. PATENT DOCUMENTS

| | | | |
|---|---|---|---|
| 2002/0017821 A1* | 2/2002 | Panuce | H02J 3/005 307/64 |
| 2008/0088182 A1* | 4/2008 | Lathrop | H02J 9/06 307/64 |
| 2008/0091625 A1 | 4/2008 | Kremen | |
| 2011/0148205 A1 | 6/2011 | Moon | |
| 2011/0215640 A1 | 9/2011 | Donnelly et al. | |
| 2011/0232714 A1 | 9/2011 | Bhavaraju et al. | |
| 2011/0273917 A1 | 11/2011 | Maitra et al. | |
| 2012/0193987 A1 | 8/2012 | Siglock | |
| 2013/0229057 A1* | 9/2013 | Taima | H02J 3/32 307/19 |
| 2013/0328397 A1 | 12/2013 | Lee | |
| 2014/0111137 A1 | 4/2014 | Tanikawa | |
| 2014/0217826 A1 | 8/2014 | Oguchi et al. | |
| 2015/0021999 A1 | 1/2015 | Rodriguez | |
| 2015/0214779 A1 | 7/2015 | Tomassi | |
| 2015/0229268 A1 | 8/2015 | Satake | |
| 2015/0263668 A1 | 9/2015 | Sader | |
| 2016/0036235 A1* | 2/2016 | Getsla | H02J 3/383 307/80 |
| 2016/0315498 A1 | 10/2016 | Narla et al. | |
| 2017/0012433 A1* | 1/2017 | Estes | H02J 3/383 |
| 2017/0179726 A1* | 6/2017 | Garrity | H02J 3/383 |
| 2017/0229867 A1* | 8/2017 | Ghotra | G05B 11/01 |

FOREIGN PATENT DOCUMENTS

| | | |
|---|---|---|
| WO | 2014/083082 A1 | 6/2014 |
| WO | 2016036419 | 3/2016 |

OTHER PUBLICATIONS

Decision to Grant received for European Patent Application No. 16720003.9, dated Jul. 16, 2020, 2 pages.
Energie-Experten, "Einsatz und Vorteile von String Wechselrichtern", Online available at: <energie-experten. Org>, Apr. 7, 2014, 3 pages (Official Copy Only) See Communication under 37 CFR § 1.98(a) (3).
Final Office Action received for U.S. Appl. No. 15/203,770, dated Jul. 19, 2017, 13 pages.
First Action Interview—Office Action received for U.S. Appl. No. 15/203,770, dated May 8, 2017, 7 pages.
Intention to Grant received for European Patent Application No. 16720003.9, dated Feb. 28, 2020, 7 pages.
International Preliminary Report on Patentability received for PCT Patent Application No. PCT/US2016/027468, dated Nov. 2, 2017, 11 pages.
International Search Report and Written Opinion received for PCT Patent Application No. PCT/US2016/027468, dated Jun. 27, 2016, 13 pages.
"Maximum Power Point Tracking", Wikipedia, dated Feb. 4, 2021, 9 pages.
Non-Final Office Action received for U.S. Appl. No. 14/798,069, dated Dec. 9, 2015, 14 pages.
Notice of Allowance received for U.S. Appl. No. 14/798,069, dated Apr. 14, 2016, 6 pages.
Notice of Allowance received for U.S. Appl. No. 15/203,770, dated Dec. 19, 2017, 8 pages.
Office Action received for European Patent Application No. 16720003.9, dated Nov. 26, 2018, 6 pages.
"Planning Guidelines—SMA Smart Home—The System Solution for Greater Independence", 2004, 75 pages.
Pre-Interview First Office Action received for U.S. Appl. No. 15/203,770, dated Feb. 28, 2017, 5 pages.
Solar inverter—Wikipedia, URL: https://de.wikipedia.org/w/index.php?title=Solarwechselrichter&oldid=129132667, retrieved on Feb. 4, 2021, 5 pages.
Summons to Attend Oral Proceedings received for European Patent Application No. 16720003.9, mailed on Jul. 25, 2019, 8 pages.

* cited by examiner

MANUAL TRANSFER SWITCH FOR ONSITE ENERGY GENERATION AND STORAGE SYSTEMS

CROSS-REFERENCES TO RELATED APPLICATIONS

This claims priority to U.S. Provisional Patent Application No. 62/419,424, filed on Nov. 8, 2016, the disclosure of which is hereby incorporated by reference in its entirety for all purposes.

BACKGROUND

Onsite energy generation systems are known in the art. Distributed solar power generation is one such onsite energy generation system. In a typical distributed solar energy system, solar panels or photovoltaic (PV) modules are installed on a flat or South-facing roof plane of a customer premises. The direct-current power generated by the solar panels is converted to AC power using one or more inverters and that AC power is in turn delivered to the customer's main electrical panel or to a parallel line tap somewhere between the customer's meter and panel. In this way, power generated by the PV panels may be supplied to the loads on the main electrical panel or, assuming back-feeding is permitted, back-fed to the grid causing the meter to run in reverse.

Electrical utilities require that onsite energy generation systems do not back-feed any power to the grid during power outages. The reason for this being that line workers who are repairing the grid expect it to be free of current when the grid is down. If, however, the customer's onsite energy generation system is feeding current to the grid, those workers could be injured by unexpected voltage potential and current flow. As a result, grid-tied onsite energy generation systems typically do not operate when the grid is down.

Recent developments have made it possible to add distributed energy storage systems to existing onsite energy generation systems such as solar systems. Such systems are referred to herein as onsite energy generation and storage systems (OEGSS). Onsite energy generation systems with integrated energy storage provide several benefits to the customer, the system owner and the grid operator. First, the energy storage system can provide back-up power to the premises in the event of a grid outage. Second, the energy storage system can allow customers to utilize power at night from the PV energy generated and stored in the energy storage system during the day without needing to back-feed power to the grid so that customers can recoup their investment in their onsite energy generation systems in areas where net metering is prohibited or of little relative value. Finally, utilities and/or solar providers may use distributed energy storage to supplement grid power in times of peak demand. To insure safety for utility line workers, all of these possible use cases require mechanisms to prevent power from being back-fed to the utility when the utility grid is down, while still allowing customers to enjoy the benefits of onsite energy generation.

In a typical OEGSS, a PV back-feed breaker is used to selectively allow or prevent the flow of power from the OEGSS to be back-fed to the grid and/or to the main electrical panel. Referring to FIG. 1, a simplified diagram of such a conventional OEGSS is shown. The OEGSS shown in FIG. 1 includes a photovoltaic (PV) array or module 10 and an energy storage device 20 connected to an inverter 30.

In normal operation, that is when the PV array 10 is generating power, inverter 30 may convert that power from DC to AC and provide it to main panel 40 through on-grid connection 14. Main electrical panel 40 includes back-feed breaker 42, or similar main panel interface, that is rated to the inverter's maximum nameplate rating (e.g., 40 A). Main electrical panel 40 also includes main breaker 43 that connects bus bar 46 to power meter 70 disposed between the grid and the bus bar. Main breaker 43 is configured to protect the residence from a possible over-current situation as well as to provide a mechanism for shutting off the flow of power from the grid into the customer premises. Main panel 40 further includes a multitude of circuits (e.g., wires) that are in turn connected to multiple household loads through individual circuit breakers 44. Circuit breakers 44 may have amperage ratings in the range between 10 A and 30 A for protecting the different home loads. Since the OEGSS includes energy storage device 20, inverter 30 is responsible for providing isolated AC back-up power via internal or external switches for on-site loads during grid outages. The isolated AC power is protected and disconnected using a back-up, off-grid, or standby breaker 52. Since off-grid breaker 52 is an isolated AC power breaker, it may or may not reside within main electrical panel 40. Per NEC code, if the largest circuit breaker in the main electrical panel is less than or equal to 40 A (e.g., in this scenario) then off-grid breaker 52 can be in the main panel and if greater than 40 A, it has to be located outside the main panel. For this reason, conventional OEGSSs provide back-up power to a sub-panel 50 through off-grid breaker 52 and off-grid connection 15. The conventional systems have the drawback of migration of home loads from the main panel to the separate sub-panel, which is a tedious task and requires a thorough planning in advance. Also, when the grid is on, power to the sub-panel flows through the inverter (or through external switches, as applicable); this limits the number of loads (called critical loads or protected loads) that can be backed up. Further, when the OEGSS includes energy storage, a separate over-current protection device (OCPD) breaker must be either fixed if the inverter has internal transfer relays, or is engaged by an external switch on or near the inverter that can be selectively activated to provide isolated AC power directly to the main panel without allowing back-feed to the grid. Currently, however, there is no single, cohesive solution to accomplish all of these functions.

SUMMARY

This disclosure describes various embodiments that relate to systems and apparatus for cost effectively and efficiently providing power to home loads and channeling any excess power to the AC grid or to an energy storage system for backup and/or delayed consumption. The systems and apparatus of the disclosure may include an onsite energy generation and storage system (OEGSS) having a renewable energy source (e.g., solar panels) and an energy storage system both coupled to an inverter. The inverter may include a bidirectional battery pack connection configured to supply energy to or receive energy from the energy storage system, a bidirectional (input/output) connection configured to supply power to or receive power from the AC grid, and an output connection configured to supply power from one or both of the energy storage system and the renewable energy source (e.g., solar panels). A manually controlled coupling mechanism is configured to enable power transfer between the AC grid and the inverter via the inverter's bidirectional connection when in a first position (e.g., on-grid position), and also enable the main breaker in the main electrical panel at the same time (if applicable) and to enable power transfer from the one or both of the energy storage system and the renewable energy source (e.g., solar panels) to the home loads when in a second position (e.g., off-grid position). The manually controlled coupling mechanism may be located in a separate subpanel in the vicinity of the main electrical panel or disposed within the main electrical panel. The manually controlled coupling mechanism allows customers to back-up their entire main panel or subpanel (as applicable) and allow the customer to choose which load(s) to be on or off based on the customer's needs. This also avoids the cost and effort of migrating loads from the main panel to a back-up subpanel.

In accordance with the present disclosure, any excess energy generated by a renewable energy source of an onsite energy generation and storage system can be stored in a local energy storage system and/or transferred to the AC grid when the AC grid operates in its normal condition (e.g., is in on-grid condition), or transfer stored energy and/or renewable energy to the loads when the grid is not operating in the normal condition (e.g., is in off-grid condition) through a manually controlled coupling mechanism. The manually controlled coupling mechanism may include a first contact portion having a first electrical contact for coupling to the electric grid and a second electrical contact for coupling to an on-grid AC terminal of an inverter, a second contact portion having a third electrical contact for coupling to an off-grid output terminal of the inverter, and a manually activated multi-position switch for selecting between the first and second contact portion. In a first position, only the first contact portion of the manually controlled coupling mechanism is activated to transfer power between the electric grid, the on-grid AC terminal of the inverter and a main electrical panel, and in the second position, only the second contact portion is activated to supply power from the off-grid output terminal of the inverter to the main electrical panel Some embodiments of the present invention also provide a system for energy storage and conversion to supply power to the grid and the home loads via a manually controlled coupling mechanism.

Other aspects and advantages of the invention will become apparent from the following detailed description taken in conjunction with accompanying drawings, which illustrate, by way of example, the principles of the described embodiments.

BRIEF DESCRIPTION OF THE DRAWINGS

In order to facilitate a better understanding of the present disclosure, reference is now made to the accompanying drawings, in which like elements are referenced with like numerals. These drawings should not be construed as limiting the present disclosure, but are intended to be exemplary only.

DETAILED DESCRIPTION

Figure 1:
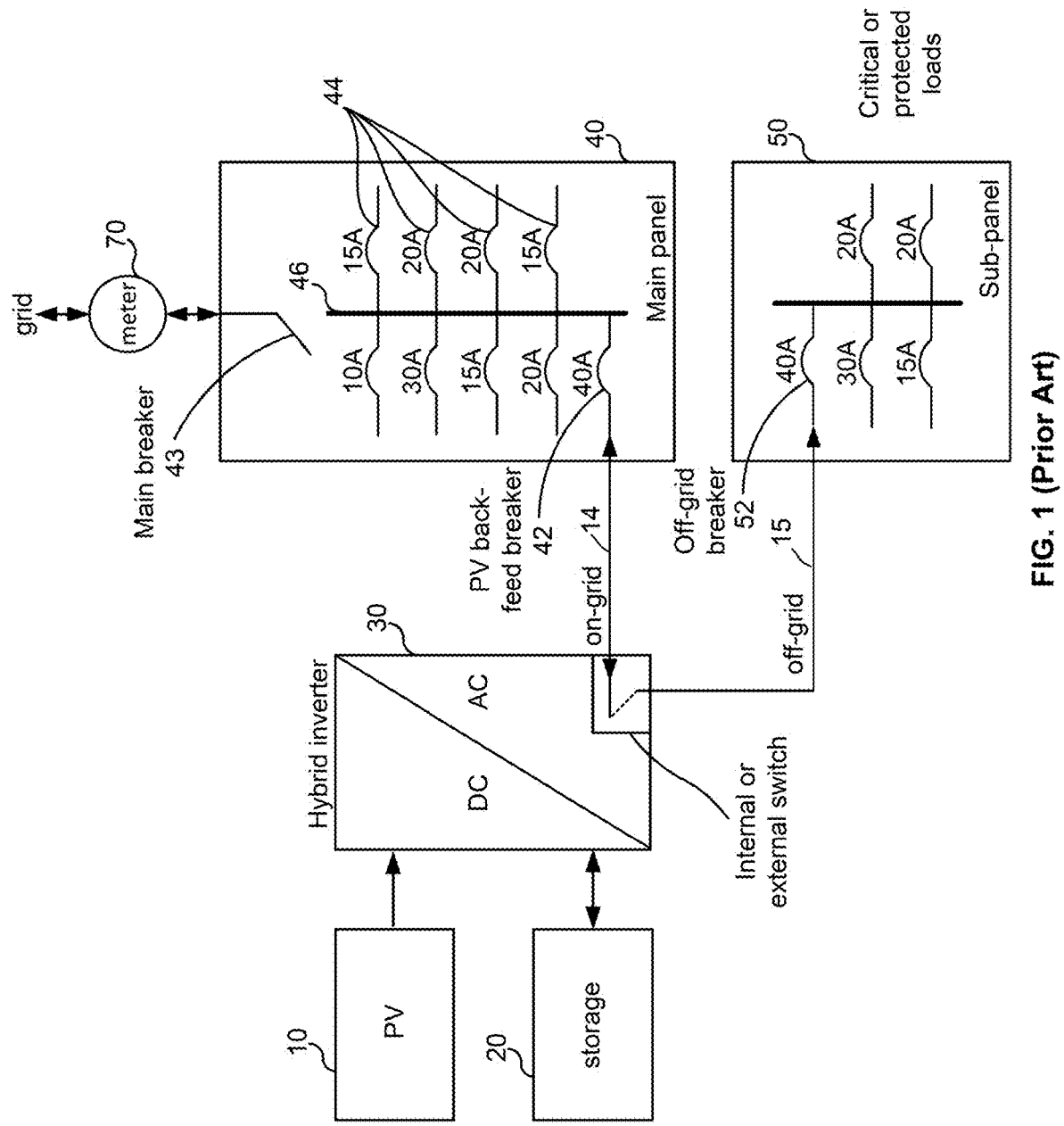
FIG. 1 is a block diagram of a typical energy generation and storage system with a main electrical panel and a subpanel according to the prior art.

Various embodiments of the invention comprise a manual transfer switch, also known as a two-position mechanical interlock that allows for selective routing of AC power between the grid, the onsite energy generation and storage system and a customer's main electrical panel. As used herein, the phrases "main electrical panel," "main panel," or "electrical panel" may be used interchangeably to refer to a customer's main electric service panel.

According to some embodiments of the present disclosure, a manually controlled coupling mechanism for onsite energy generation and storage systems includes a first contact portion having a first electrical contact for coupling to an electric grid and a second electrical contact for coupling to an on-grid AC terminal of an inverter, a second contact portion having a third electrical contact for coupling to an off-grid output terminal of the inverter, and a manually activated multi-position switch. In some embodiments, the manually controlled coupling mechanism is a manually operated two-position switch. In the first position, only the first contact portion is activated to allow power transfer between the electric grid, the on-grid AC terminal of the inverter and the main breaker in a main electrical panel at the same time. In the second position, only the second contact portion is activated, allowing back-up power transfer from the off-grid output terminal of the inverter to the main electrical panel.

The manually controlled coupling mechanism of the present disclosure may be enclosed within a protective housing located in a subpanel in the vicinity of the main panel or within the main panel. The manually controlled coupling mechanism eliminates the use of critical load subpanel 50 of the prior art technique shown in FIG. 1. The use of the manually controlled coupling mechanism of the present disclosure in an onsite energy generation and storage system provides many advantages that may include significant installation time and cost savings over the prior art technique because critical or protected loads do not have to be preselected and separately wired to the critical load subpanel. For example, critical loads may change over time or need to be moved within the premises. Such changes would require significant rewiring in conventional systems that use separate subpanels for critical loads. The integration of the manually controlled coupling mechanism in the energy generation and storage system according to the present disclosure will obviate the significant rewiring in the event critical loads are changed or moved. Thus, significant time and effort to rewire electrical connections can be avoided and wiring mistakes can be prevented according to embodiments of the present disclosure. Consumers can merely switch off unused loads before manually switching the manually controlled coupling mechanism to the off-grid position to use backup power of the onsite energy generation and storage system for powering only the needed loads. This greatly simplifies installation of on-site energy generation and storage systems while insuring true isolation in the off-grid mode, thereby preventing the flow of power from the OEGSS to the grid during periods of grid outage (i.e., islanding).

Figure 2:
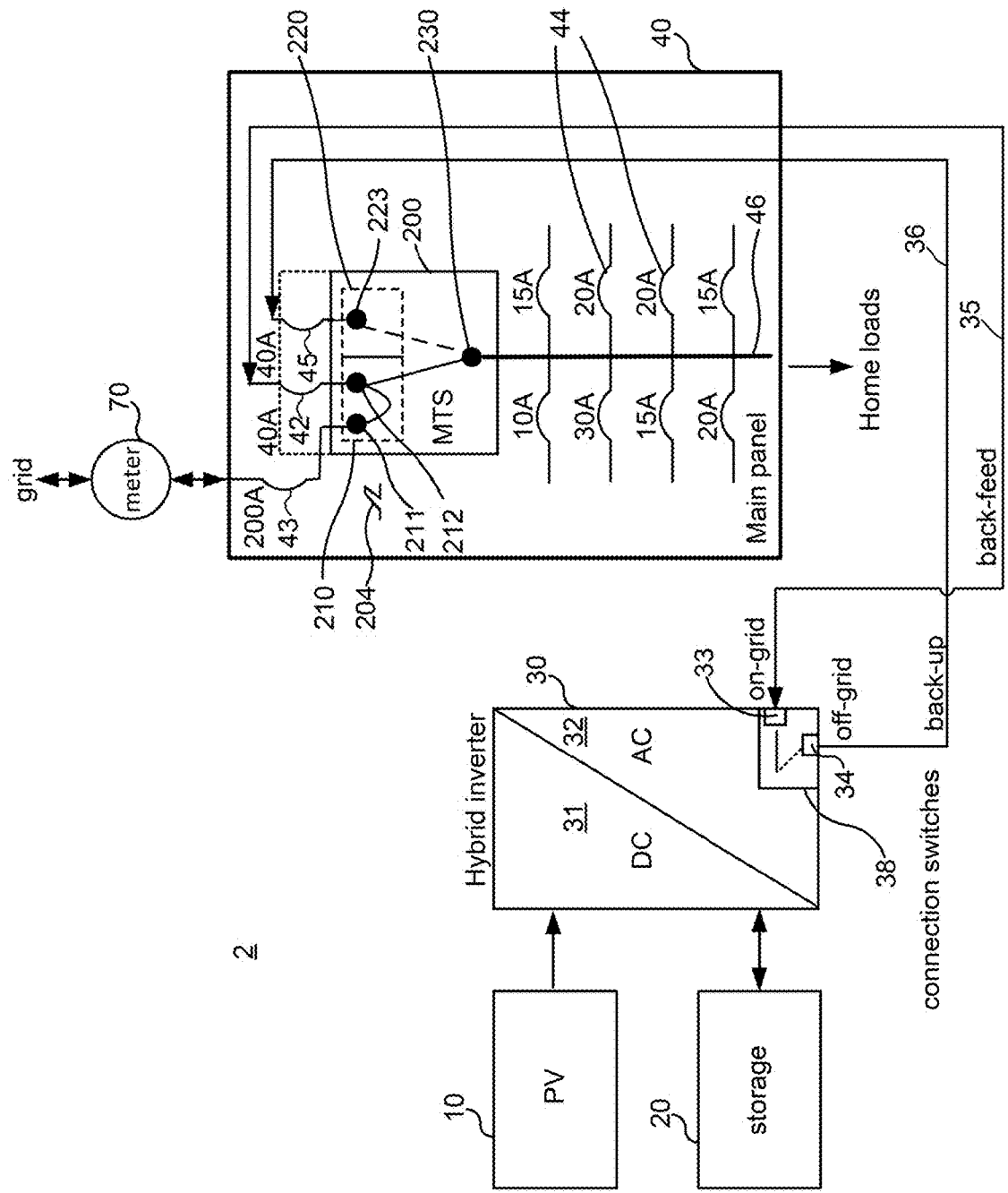
FIG. 2 is a block diagram of an onsite energy generation and storage system including a manually controlled coupling mechanism disposed in the main electrical panel, according to some embodiments of the present disclosure.

FIG. 2 illustrates a block diagram of an exemplary solar energy generation and storage system 2 that includes an array of PV modules 10, storage device 20, one or more hybrid inverters 30, and main electrical service panel 40 including multiple circuit breakers 44 that provide power to home loads.

Main panel 40 may include manual transfer switch (MTS) or mechanical interlock kit (MIK) 200 disposed between power meter 70 and output terminals of inverter 30. The term "manual transfer switch" or "MTS" will be used alternatively in this disclosure to refer to a mechanical switch that has only two positions and is manually activated. The designation "hybrid" in "hybrid inverter" refers to the fact that the inverter not only converts DC power from the PV array to AC power, but also serves as an inverter and charger for the connected storage system (i.e., multi-mode operation).

MTS 200 includes first contact portion 210 having first electrical contact 211 for coupling to the AC grid (also referred to herein as "grid") and second electrical contact 212 for coupling to on-grid terminal 33 of hybrid inverter 30 through back-feed connection 35. MTS 200 also includes second contact portion 220 having third electrical contact 223 for coupling to backup output terminal 34 of hybrid inverter 30 through back-up/off-grid connection 36. MTS 200 additionally includes terminal 230 that electrically connects first and second contacts 211, 212 to bus bar 46 of main panel 40 when the system operates in a normal or on-grid condition (i.e., the AC grid is in normal condition). Terminal 230 also electrically connects third electrical contact 223 to bus bar 46 in an off-grid or back-up condition (e.g., when the AC grid has power outage). Switch 204 may selectively establish electrical connection between first and second contacts 211, 212 of MTS 200 to bus bar 46 when it is manually activated to be in a first position (on-grid position), or may establish electrical connection between third contact 223 of MTS 200 to bus bar 46 when switch 204 is manually activated to be in a second position (off-grid position). Switch 204 may be a toggle switch mounted on a box that houses MTS 200, and is selectively positioned between the first and second positions. In some embodiment, switch 204 may be a lever, a rod, a button, a bar, or the like that can activate a mechanical solenoid or some mechanical mechanisms to activate MTS 200 into the first position or the second position. It is noted that MTS 200 can only be in the first position or in the second position, but not in both positions. In some embodiments, a box housing MTS 200 may include visual indicia in correspondence to a position of switch 204 indicating the respective position. For example, the visual indicia may be "on", "on-grid", "back-feed" and the like when two-position switch 204 is in the first position, and may be "off", "off-grid", "back-up", and the like when two-position switch 204 is in the second position.

Hybrid inverter 30 may include DC side 31 and AC side 32 that are connected to one another via a central capacitor bank (not shown). DC side 31 may include circuitry (not shown) for performing maximum power point tracking (MPPT) on the DC output of PV array 10 and a DC/DC boost stage for boosting the DC voltage provided by PV array 10 to a level appropriate for inversion. Storage device 20 may include one or more low voltage battery modules or one or more high voltage battery modules. It should be appreciated that other types of storage devices may be substituted for high voltage battery modules. In the case that storage system 20 consists of low voltage battery modules, the storage system may include a DC/DC buck-booster to boost the low voltage to a higher voltage level for the AC side for discharging or buck the high voltage to a lower level when charging. The AC side converts the energy from the central capacitor bank to AC current to supply to home loads and/or the AC grid. This typically involves synchronizing the voltage and phase of the hybrid inverter current/power to the AC grid. The AC grid is not limited to single-phase but is also applicable to three-phase systems, e.g., 120 Vac, 208 Vac, 230 Vac, 240 Vac, 277 Vac, 400 Vac, 480 Vac, 690 Vac, and the like. AC side 32 of inverter 30 may have an input/output terminal 33 (also referred to as on-grid or back-feed terminal) configured to transfer power from either of PV array 10, storage device 20, or both simultaneously to the AC grid through first and second electrical contacts 211, 212 of MTS 200. AC side 32 may also include output terminal 34 configured to transfer power from either of PV array or PV modules 10, storage device 20, or both simultaneously to the home loads through third electrical contact 223 of MTS 200 when the AC grid is not available.

Main panel 40 may include main breaker 43 disposed between power meter 70 and first electrical contact 211 of MTS 200 for protecting the home loads from an over-current situation. Main panel 40 may also include circuit breaker 42 disposed between first output terminal 33 of hybrid inverter 30 and second electrical contact 212 of MTS 200. Main panel 40 may additionally include circuit breaker 45 disposed between second output terminal 34 of hybrid inverter 30 and third electrical contact 223 of MTS 200. In some embodiments, circuit breakers 42 and 45 may be incorporated in a box that houses MTS 200, as indicated by the dotted-line box within MTS 200 in FIG. 2.

System 2 may also include connection (or transfer) switches 38 (e.g., solid-state relays, electronic switches, electro-mechanical relays) disposed internal or external to hybrid inverter 30. The switches 38 are configured to selectively connect the AC grid, inverter 30, and the home loads with each other under the control of a controller (not shown). For example, connection switches 38 are connected to input/output AC terminal 33 and may be configured, under the control of the controller, to transfer power from PV array 10 to the AC grid or to storage device 20, or to transfer power to/from the AC grid from/to storage device 20. Switches 38 are also connected to output terminal 34 and may be configured, under the control of the controller, to transfer power from PV array 10 and/or storage device 20 to one or more home loads when the AC grid is unavailable.

Figure 3:
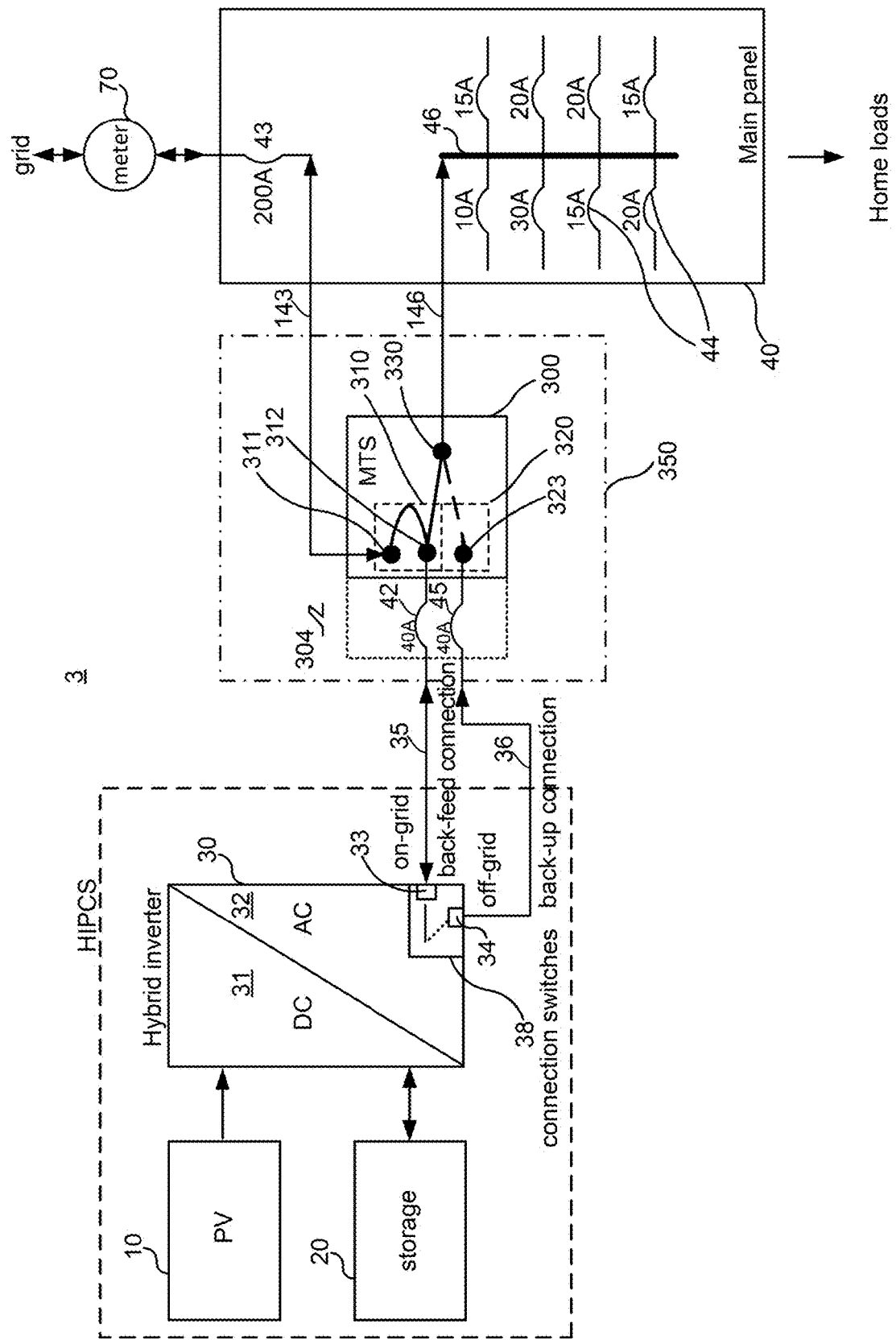
FIG. 3 is a block diagram of an onsite energy generation and storage system including a manually controlled coupling mechanism disposed outside the main electrical panel, according to some embodiments of the present disclosure.

FIG. 3 is a simplified block diagram of solar energy generation and storage system 3 according to another embodiment of the present disclosure. This embodiment is similar to that in FIG. 2 except that MTS 300 is disposed outside main panel 40. The connections between MTS 300 and each of utility meter 70, main panel 40 and inverter 30 are similar to those in FIG. 2 and thus will not be described here. In some embodiments, MTS 300 may be enclosed in housing (e.g., subpanel housing) 350 that is configured to be mounted on a wall of a residence or other building in the vicinity of the main panel. In some embodiments, circuit breakers 42 and 45 respectively connected between terminals 312, 323 of MTS 300 and terminals 33, 34 of inverter 30 may be enclosed within housing 350. In FIG. 3, hybrid inverter 30 together with PV array 10 and storage device 20 is marked as HIPCS (hybrid inverter power control systems), which will be used in describing other embodiments.

Figure 4:
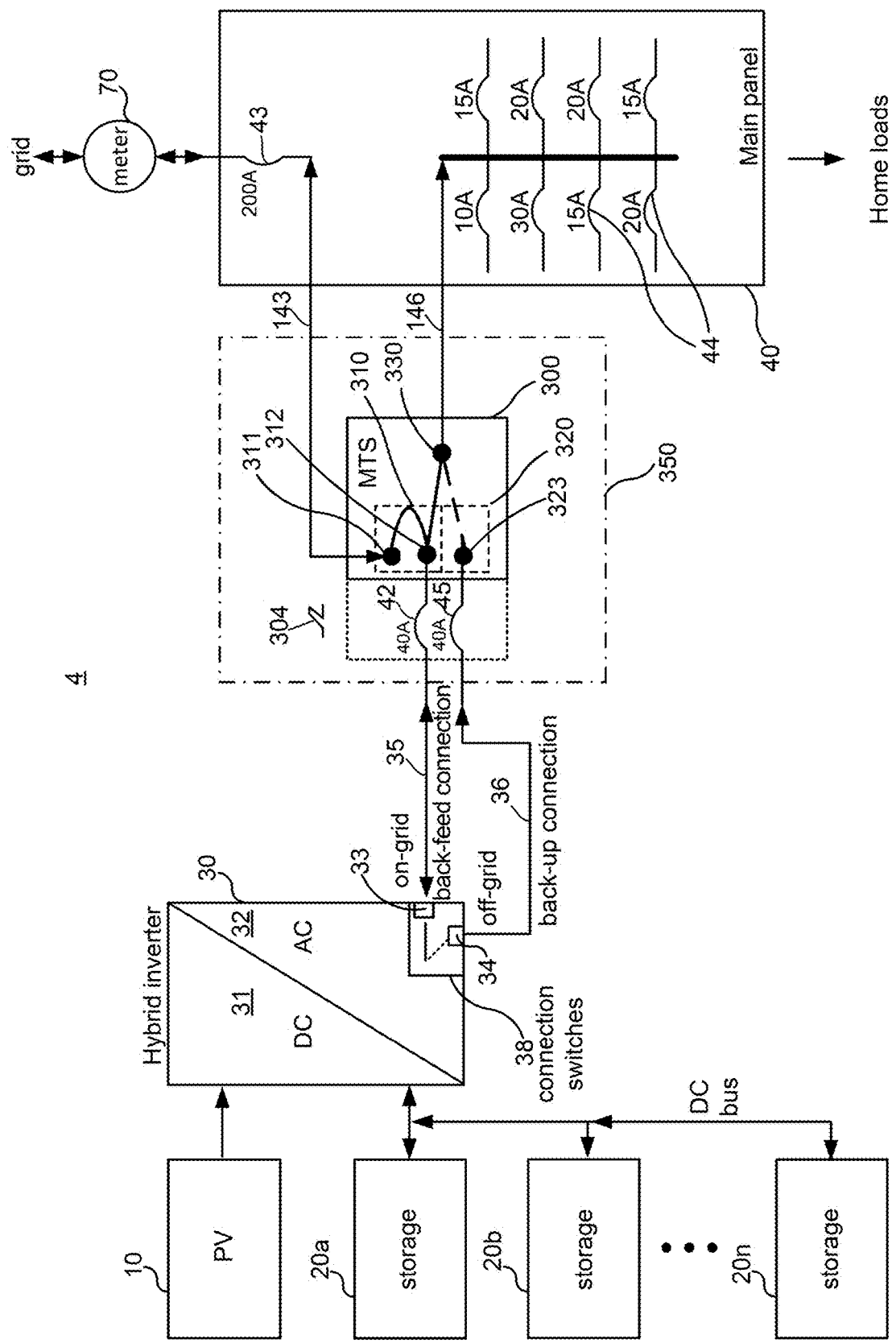
FIG. 4 is a block diagram of an onsite energy generation and storage system including a manually controlled coupling mechanism and multiple parallel-connected storage blocks, according to some other embodiments of the present disclosure.

FIG. 4 is a simplified block diagram of solar energy generation and storage system 4 according to other embodiments of the present disclosure. System 4 is similar to system 3 except that more energy storage capacity is provided relative to system 3 by utilizing multiple storage devices 20a to 20n. In various embodiments, energy storage devices 20a to 20n are connected in parallel through a DC bus to provide greater energy capacity. In some embodiments, MTS 300 and circuit breakers 42, 45 in system 4 may be disposed within main panel 40, similar to that shown in FIG. 2.

Figure 5:
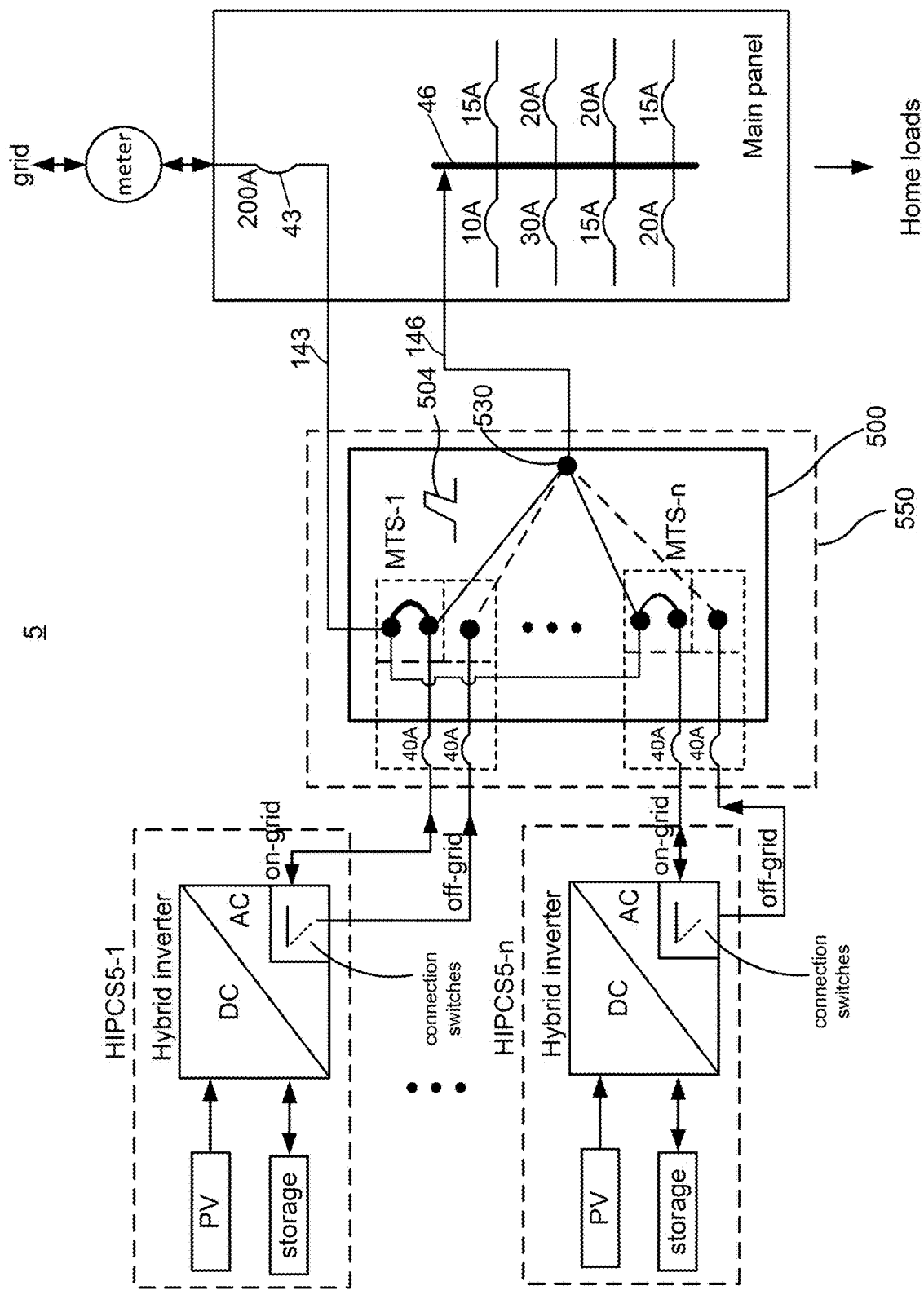
FIG. 5 is a block diagram of an onsite energy generation and storage system including multiple manually controlled coupling mechanisms, according to further embodiments of the present disclosure.

FIG. 5 is a simplified block diagram of solar energy generation and storage system 5 according to yet other embodiments of the present disclosure. System 5 includes a number of hybrid inverter power control systems HIPCS5-1 to HIPCS5-n connected in parallel. Each HIPCS is similar to the HIPCS shown in system 3 in FIG. 3. System 5 has a number of advantages over system 3. It can provide more output power and store more energy because it has a number of hybrid inverter power control systems connected in parallel, and each of the hybrid inverter power control systems has its own energy storage system.

System 5 also include a manually controlled coupling mechanism 500 having a multitude of mechanical transfer switches MTS-1, MTS-n. Each of hybrid inverter power control systems HIPCS5-1 to HIPCS5-n is connected to a corresponding MTS-1 to MTS-n. In some embodiments, each of mechanical transfer switches MTS-1 to MTS-n may be similar to or the same as MTS 300 in FIG. 3 described above except that all of the mechanical transfer switches in FIG. 5 have a common terminal 530. In some embodiments, only one manually controlled switch 504 is used to activate all of the mechanical transfer switches into the first contact position or the second contact position. In the embodiment shown in FIG. 5, mechanical transfer switches MTS-1 to MTS-n have one common terminal 530 that is configured to transfer power from hybrid inverter power control systems HIPCS5-1-HIPCS5-n to bus bar 46 of the main panel through electrical connection 146. In some other embodiments, each of mechanical transfer switches MTS-1 to MTS-n may have a corresponding manually controlled switch (e.g., 504-1, . . . , 504-n) and a corresponding terminal (e.g., 530-1, . . . , 530-n), so that each mechanical transfer switch MTS can be separately activated into the first contact position or the second contact position to transfer power from the corresponding hybrid inverter power control system to critical loads connected to the corresponding terminal.

In some embodiments, system 5 may include subpanel housing 550 in which manually controlled coupling mechanism 500 is disposed, and which can be installed near the main panel. In some embodiments, circuit breakers corresponding to each MTS are also disposed in subpanel housing 500. As with other embodiments, subpanel housing 550 in system 5 may include visual indicia of the set position of switch 504. In some embodiments, manually controlled coupling mechanism 500 may be disposed in the main panel.

Figure 6:
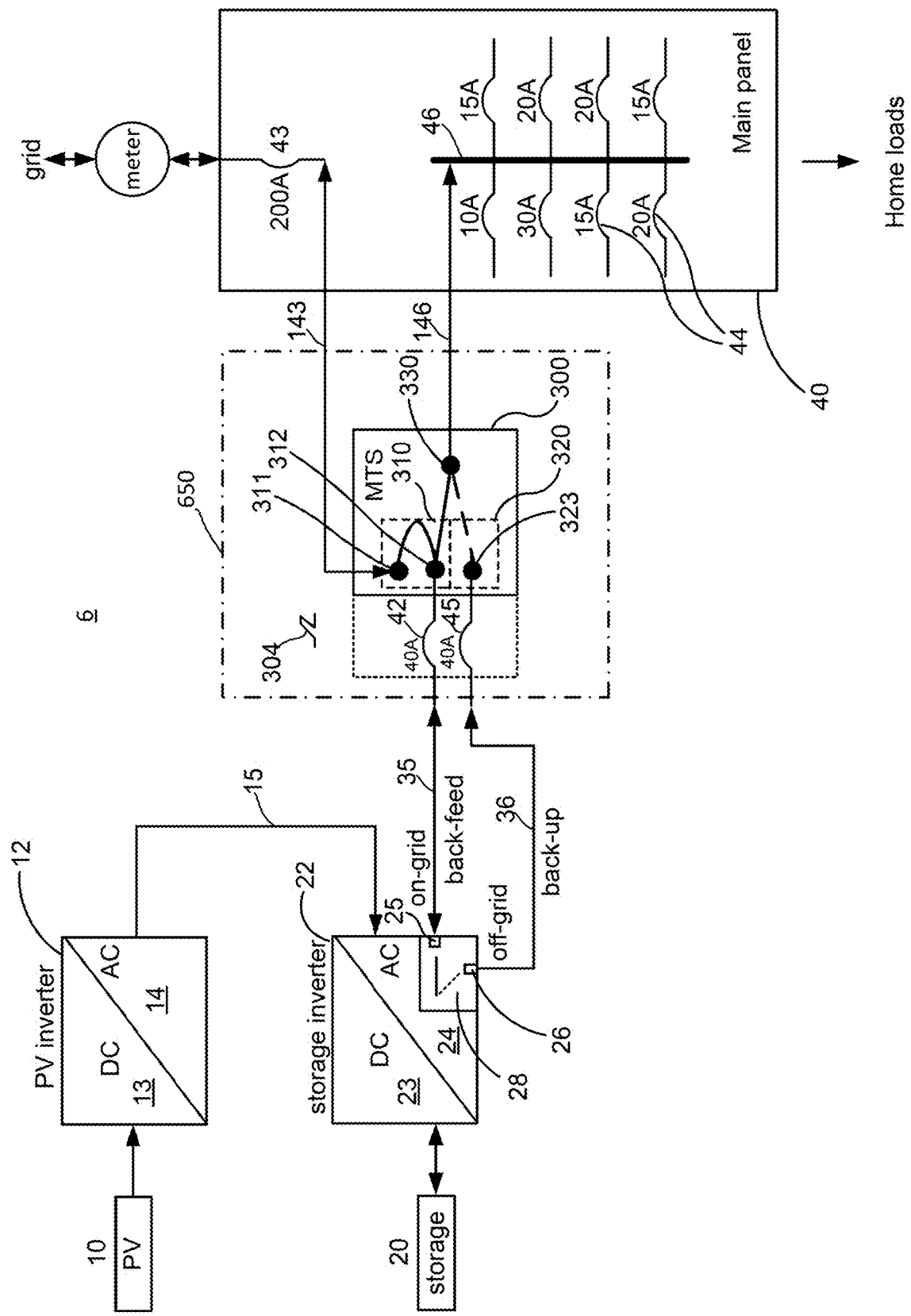
FIG. 6 is a block diagram of an onsite energy generation and storage system including a manually controlled coupling mechanism and separate inverters for the PV array and the storage block, according to still some other embodiments of the present disclosure.

FIG. 6 is a block diagram of an exemplary OEGSS 6 according to still other embodiments of the present disclosure. OEGSS 6 may include array of PV modules 10 coupled to PV inverter 12, energy storage device 20 coupled to storage inverter 22, manual transfer switch 300, and main electrical service panel 40. In one embodiment, PV array 10 may include a plurality of micro-inverters, in which case, the output/input of storage inverter 22 will be connected in parallel to a common AC bus combining AC output of the micro-inverters making up the PV array. In the exemplary embodiment of FIG. 6, PV inverter 12 may include DC side 13 and AC side 14 that are connected to one another via a capacitor bank (not shown). AC side 14 converts energy stored in the capacitor bank to AC and supplies the AC power to the home loads, to storage device 20 for storage in battery modules, or to the grid. This typically involves synchronizing the voltage and phase of the PV inverter current/power output to the grid interconnection or storage inverter voltage. Storage block 20 may include one or more low voltage battery modules or one or more high voltage battery modules. Storage inverter 22 may include DC side 23 and AC side 24. Storage inverter 22 may function as a rectifier (e.g., during charging) or perform switching converting AC power from PV inverter 12 and/or the grid into DC power to charge/discharge battery modules in storage device 20. In the case that the storage system consists of low voltage battery modules, storage inverter 22 may include a DC/DC buck-booster stage (not shown) to boost the low voltage to a higher voltage level for the AC side or buck the high voltage to a lower voltage level when charging. For example, if the rectified DC voltage exceeds the storage system's maximum allowable voltage, which it typically will since both the grid and PV inverter 12 provide at least 170 volts, the buck-boost stage will buck that voltage down to a safe level of the storage system.

During the discharge of storage device 20, power leaving the storage block may again flow through the DC/DC buck-boost stage where it is stepped up to a level equal to or above the grid voltage levels (e.g., 170 volts) before inversion to AC (by AC side 24) for supply to the home loads. Storage inverter 22 is a bidirectional inverter that can receive power from PV array 10 or the grid and store that power in battery modules to storage block 20.

Manual transfer switch 300 in system 6 of FIG. 6 is similar to MTS 300 of FIG. 3 described above and will not be described here for the sake of brevity. System 6 is advantageous where, for example, a PV inverter already exists and the user wants to add storage for back-up at later times as retrofit. Sub-panel 650 can be easily integrated between the PV system and/or inverter and the main electrical service panel if a storage device is later added.

System 6 may also include connection switches 28 (e.g., solid-state relays, electronic switches, electro-mechanical relays) disposed internal or external to storage inverter 22. Connection switches 28 are configured to selectively connect the grid, storage inverter 22, PV inverter 12, and the home loads with each other under the control of a controller (not shown). For example, connection switches 28 are connected to input/output terminal 25 (also referred to as on-grid or back-feed terminal) and are configured to transfer power from PV array 10 (through PV inverter 12) to the grid or storage device 20, or to provide power to/from the grid from/to storage device 20. Connection switches 28 are also connected to output terminal 26 (also referred to as the off-grid or back-up terminal) and are configured to transfer power from PV array 10 or storage device 20 to one or more home loads when the grid is unavailable. Input/output terminal 25 is coupled to second electrical contact 312 of MTS 300 through back-feed connection 35. Output terminal 26 is coupled to third electrical contact 323 of MTS 300 through back-up connection 36.

In some embodiments, system 6 may include a multitude of storage blocks 20 connected in parallel to increase energy capacity, similar to storage blocks 20a-20n in system 4 of FIG. 4. In some embodiments, the combination of PV array 10, PV inverter 12, storage device 20 and storage inverter 22, may be repeated multiple times and connected in parallel, with each combination having a dedicated MTS, similar to HIPCS5-1 to HIPCS5-n and MTS-1 to MTS-n in FIG. 5. In some embodiments, system 6 may include sub-panel housing 650 in which MTS 300 is disposed, and which can be installed on a wall near the main panel. In some embodiments, circuit breakers 42, 45 may also be disposed in sub-panel housing 650. As with other embodiments, sub-panel housing 650 may include a visual indicia (not shown) that indicates the current set position of switch 304. In some embodiments, MTS 300 may be disposed in main panel 40 similar to that shown in system 2 of FIG. 2.

Figure 7:
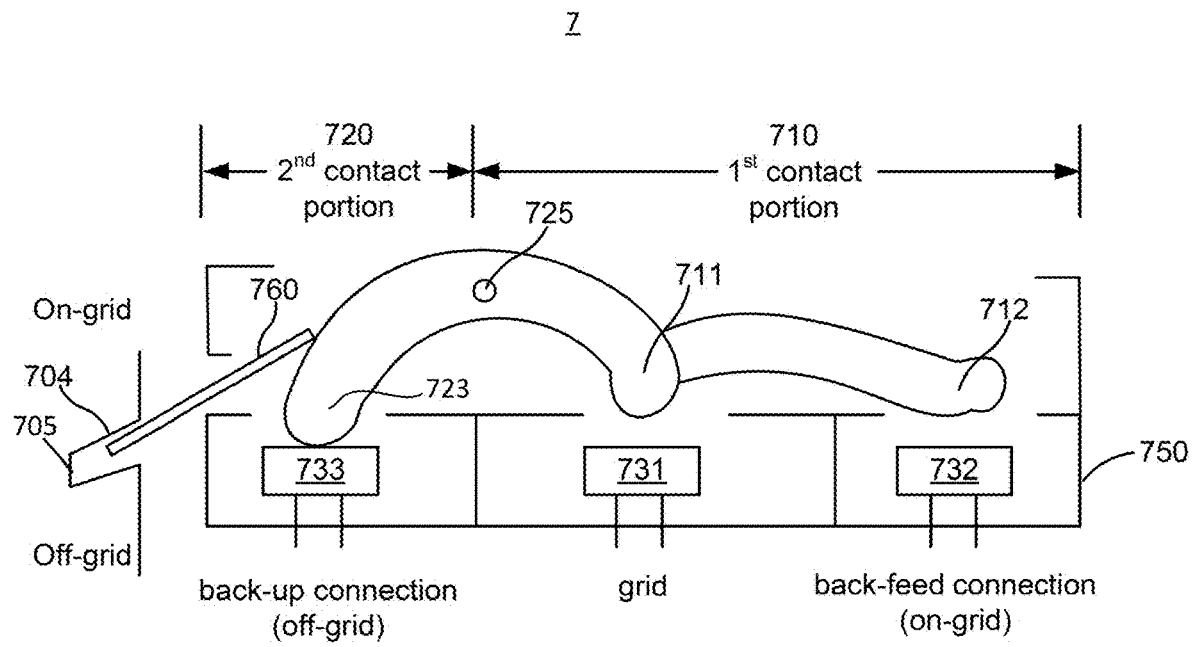
FIG. 7 is a cross-sectional view of a manually controlled coupling mechanism according to an exemplary embodiment of the present disclosure.

FIG. 7 is a cross-sectional view of manually controlled coupling mechanism 7 according to an exemplary embodiment of the present disclosure. Manually controlled coupling mechanism 7 may be used as the MTS in the various embodiments described above, and includes an internal switch assembly having first contact portion 710 and second contact portion 720. First contact portion 710 includes first electrical contact 711 and second electrical contact 712. Second contact portion 720 includes third electrical contact 723. First contact portion 710 and second contact portion 720 may have the shape of a seesaw switch that is moveable around shaft 725. Shaft 725 may extend from each side of the switch assembly and is pivotally mounted in housing 750. Housing 750 may have a plurality of mounting holes (not shown) to facilitate mounting housing 750 to a wall or corresponding to the mounting holes on the breakers. Manually controlled coupling mechanism 7 further includes first contact area 731 for electrically connecting first electrical contact 723 to the grid, second contact area 732 for electrically connecting second electrical contact 712 to the off-grid output terminal of the inverter, and third connector 733 for electrically connecting third electrical contact 723 to on-gird input/output terminal of the inverter.

Manually controlled coupling mechanism 7 further includes a manually controlled user switch 704 that can be a toggle switch, a shift switch, a mechanical handle switch, a button switch and the like that has two positions (e.g., first position and second position that are mutually exclusive). Switch 704 may be connected to the internal switch assembly through a mechanical linkage such as a mechanical rod (or mechanical arm) 760 or other mechanism to move the switch assembly from the first position (e.g., on-grid) to the second position (e.g., off-grid), and vice versa. Switch 704 may be mounted in a mechanical handle 705 connected to the switch assembly so that user need only flip handle 705 of switch 704 to switch operation of the MTS between on-grid and off-grid modes of operation. The switch assembly is shown in FIG. 7 to be in the off-grid position. In some embodiments, switch 704 may be an electrical switch that can activate the switch assembly through a solenoid to a first position or a second position. For example, in the first position, both first and second electrical contacts 711, 712 are respectively in physical contact with first and second contact areas 731, 732, while third electrical 723 is open, i.e., is not in physical contact with third contact area 733. In the second position, first and second electrical contacts 711, 712 are not in physical contact with respective first and second contact areas 731, 732, while third electrical contact 723 is closed (i.e., in physical contact with third contact area 733).

Manually controlled coupling mechanism 7 may further include visual indicia (not shown) indicating the position of the first contact portion and the second contact portion. For example, the visual indicia may have labels such as "On-grid", "Off-grid", "back-feed", "back-up", and the like at a location in the vicinity of switch 704 to indicate to a user the current mode of operation.

In summary, in accordance with the present disclosure, a manually controlled coupling mechanism includes a manual transfer switch that can be only be in one of two mutually exclusive positions at any given moment in time. When in the first position, grid power is joined in parallel with a two-way connection to the on-site energy generation and storage system's inverter for the PV back-feed and/or charging the storage device. The connection to the on-site energy generation and storage system's inverter is typically lower than the maximum current rating of the main panel. In embodiments described above, MTS circuit breakers (e.g., breakers 42, 45 in FIG. 6) limit the connection to 40 A, however, it could be more or less than that. Circuit breakers may be built into the MTS or could be in-line adjacent to the MTS. When the MTS is in the second position, back-up power of the storage block may be provided to the main panel for supplying power to home loads when the grid is down. In one embodiment, the MTS circuit breakers limit the connection to 40-amps. Circuit breakers may be defined as back-up output or off-grid breakers, which are also typically rated with respect to the AC output rating of the hybrid or storage inverter (for example, 40 A and the like). Either of the first and second positions of the MTS may be set as the default switch position. The various embodiments of the invention described herein will enable the PV array, storage device or both these power sources to simultaneously supply power to the customer's main electrical service panel while remaining electrically isolated from the grid. This greatly simplifies installation of on-site energy generation and storage systems while insuring true isolation in off-grid mode.

The manually controlled coupling mechanism of the present disclosure integrated in an OEGSS as discussed above in relation to various embodiments advantageously eliminates critical load subpanel 50 of the prior art technique shown in FIG. 1. Critical or protected loads do not have to be preselected and separately wired to the subpanel. Further, critical loads may change over time or need to be moved within the premises. Such changes would require significant rewiring in conventional systems, which use subpanels for critical loads. In contrast, integration of the MTS in the energy generation and storage system according to the present disclosure would eliminate the significant rewiring in the event critical loads are changed or moved. Thus, significant time and effort to rewire electrical connections can be avoided and wiring mistakes can be prevented according to embodiments of the present disclosure. Consumers can merely switch off unused loads before manually switching the MTS to the off-grid position to use the backup power of the storage block and/or the PV array to power selected loads.

The embodiments described herein are not to be limited in scope by the specific embodiments described above. Indeed, various modifications of the embodiments, in addition to those described herein, will be apparent to those of ordinary skill in the art from the foregoing description and accompanying drawings. Further, although some of the embodiments have been described herein in the context of a particular implementation in a particular environment for a particular purpose, those of ordinary skill in the art will recognize that their usefulness is not limited thereto and that they can be beneficially implemented in any number of environments for any number of purposes. Accordingly, the disclosure should be construed in view of the full breath and spirit of the embodiments as disclosed herein.

What is claimed is:

1. A solar energy generation and storage system, comprising:
   an inverter comprising an on-grid output terminal and an off-grid output terminal; and
   a manually controlled coupling mechanism for onsite energy generation and storage systems, the manually controlled coupling mechanism comprising:
      a first contact portion having a utility grid electrical contact coupled to a utility grid, and an on-grid inverter electrical contact coupled to the on-grid output terminal of an inverter, the first contact portion being disposed between the utility grid and the inverter;
      a second contact portion having an off-grid inverter electrical contact coupled to the off-grid output terminal of the inverter; and
      a manually activated multi-position switch, wherein in a first position, the first contact portion is activated to allow power transfer between the utility grid, the on-grid output terminal of the inverter and a main electrical panel while the second contact portion remains inactive, and in the second position, the second contact portion is activated to allow power transfer from the off-grid output terminal of the inverter to the main electrical panel while the first contact portion remains inactive, electrically isolating the onsite energy generation and storage system from the utility grid.

2. The solar energy generation and storage system of claim 1, wherein the inverter further comprises a switch configured to selectively output power to the off-grid output terminal or to the on-grid output terminal.

3. The solar energy generation and storage system of claim 1, wherein the inverter is a hybrid inverter configured to convert DC power generated by an array of PV panels and by an energy storage device to AC power.

4. The solar energy generation and storage system of claim 3, wherein the energy storage device comprises:
   one or more battery modules; and
   a DC/DC converter stage to boost a low voltage of the one or more battery modules to a suitable high voltage level for supplying power to the hybrid inverter, or buck a high voltage to a suitable low voltage level for charging the one or more battery modules.

5. The solar energy generation and storage system of claim 2, wherein the inverter comprises a PV inverter coupled to an array of PV panels and a storage inverter coupled to an energy storage device whose respective outputs are combined into a single AC output.

6. The solar energy generation and storage system of claim 5, further comprising one or more switches configured to connect the single AC output to the on-grid output terminal or to the off-grid output terminal under the control of a controller.

7. The solar energy generation and storage system of claim 1, further comprising:
   a housing enclosing the first and second contact portions and configured to be mounted on a surface of a wall;
   a first circuit breaker in the housing for selectively forming an electrical connection between the on-grid output terminal of the inverter and the second electrical contact;
   a second circuit breaker in the housing for selectively forming an electrical connection between the off-grid output terminal of the inverter and the third electrical contact; and
   visual indicia disposed on the housing for indicating a current position of the manually activated multi-position switch.

8. The solar energy generation and storage system of claim 1, wherein the first electrical contact is connected to the utility grid through a main breaker of a main electrical service panel.

9. The solar energy generation and storage system of claim 1, wherein the manually controlled coupling mechanism is disposed in the main electrical service panel.

10. A solar energy generation and storage system comprising:
    a plurality of inverters, each inverter of the plurality of inverters comprising an on-grid terminal and an off-grid terminal; and
    a manually controlled coupling mechanism, comprising:
       a first set of first contact portions, each of the first contact portions having a first electrical contact for coupling to a utility grid and a second electrical contact for coupling to the on-grid terminal of a corresponding one of the plurality of inverters, the first set of first contact portions being disposed between the utility grid and the plurality of inverters;
       a second set of second contact portions, each of the second contact portions having a third electrical contact for coupling to the off-grid output terminal of a corresponding one of the plurality of inverters; and
       a manually activated multi-position switch, wherein in a first position, the first set of first contact portions are activated to allow power transfer between the utility grid, the on-grid output terminal of the inverters and a main electrical service panel while the second set of contact portions are inactive, and in the second position, the second set of second contact portions are activated to allow power transfer from the off-grid output terminal of the inverters to the main electrical panel while the first set of contact portions are inactive, electrically isolating the onsite energy generation and storage system from the utility grid.

11. The solar energy generation and storage system of claim 10, wherein the inverters are hybrid inverters, each of the hybrid inverters being coupled to an array of PV panels and an on-site energy storage device.

12. The solar energy generation and storage system of claim 10, further comprising:
    a housing enclosing the first set of first contact portions and the second set of second contact portions;
    a plurality of first circuit breakers in the housing for forming an electrical connection between an on-grid output terminal of each of the inverters and a corresponding one of the second electrical contacts; and
    a plurality of second circuit breakers in the housing for forming an electrical connection between an off-grid output terminal of each of the inverters and a corresponding one of the third electrical contacts.

13. The solar energy generation and storage system of claim 12 wherein the housing includes a visual indicia of a current position of the manually activated multiposition switch.

14. The solar energy generation and storage system of claim 12, wherein the plurality of first circuit breakers and the plurality of second circuit breakers are disposed in the housing.

15. The solar energy generation and storage system of claim 10, wherein the first set of first contact portions and the second set of second contact portions are disposed in the main electrical service panel.

16. The solar energy generation and storage system of claim 15, further comprising:
- a plurality of first circuit breakers in the main electrical service panel, each of the first circuit breakers being connected between an on-grid output terminal of one of the inverters and a corresponding one of the second electrical contacts; and
- a plurality of second circuit breakers in the main electrical service panel, each of the second circuit breakers being connected between an off-grid output terminal of one of the inverters and a corresponding one of the third electrical contacts.

17. A solar energy generation and storage system, comprising:
- a first inverter coupled to an on-site array of solar panels and configured to convert DC power generated by the on-site array of solar panels to AC power;
- a second inverter coupled to an on-site storage device that includes one or more battery packs and to an output of the first inverter, the second inverter having an on-grid output terminal and an off-grid output terminal; and
- a manually controlled coupling mechanism comprising:
  - a first contact portion having a first electrical contact connecting to a utility grid and a second electrical contact connecting to the on-grid output terminal of the second inverter, the first and second electrical contacts being electrically connected with each other and disposed between the utility grid and the first and second inverters;
  - a second contact portion having a third electrical contact connecting to the off-grid output terminal of the second inverter; and
  - a manually activated multi-position switch, wherein in a first position, the first contact portion is activated to allow power transfer between the utility grid, the on-grid output terminal of the second inverter and a main electrical panel while the second contact portion remains inactive, and in the second position, only the second contact portion is activated to allow power transfer from the off-grid output terminal of the second inverter to the main electrical panel while the first contact portion remains inactive, electrically isolating the onsite energy generation and storage system from the utility grid.

18. The solar energy generation and storage system of claim 17, wherein the first inverter provides power to the second inverter through a first unidirectional connection, and the second inverter supplies power to and receives power from the storage system through a first bidirectional connection.

19. The solar energy generation and storage system of claim 17, further comprising connection switches configured to selectively transfer power in an on-grid mode of operation or an off-grid mode of operation under the control of a controller.

20. The solar energy generation and storage system of claim 19, wherein the on-site storage device comprises a DC/DC converter stage to boost a low voltage of the one or more battery packs to a suitable high voltage level for supplying power to the second inverter, or buck a high voltage to a suitable low voltage level for charging the one or more battery packs.

\* \* \* \* \*